(12) United States Patent
Shukla

(10) Patent No.: US 9,332,063 B2
(45) Date of Patent: May 3, 2016

(54) VERSATILE APPLICATION CONFIGURATION FOR DEPLOYABLE COMPUTING ENVIRONMENTS

(71) Applicant: Microsoft Corporation, Redmond, WA (US)

(72) Inventor: Dharma Shukla, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/064,672

(22) Filed: Oct. 28, 2013

(65) Prior Publication Data

US 2014/0052840 A1 Feb. 20, 2014

Related U.S. Application Data

(63) Continuation of application No. 12/052,534, filed on Mar. 20, 2008, now Pat. No. 8,572,033.

(51) Int. Cl.
*G06F 9/445* (2006.01)
*H04L 29/08* (2006.01)

(52) U.S. Cl.
CPC .......... *H04L 67/10* (2013.01); *G06F 9/44505* (2013.01); *H04L 67/02* (2013.01)

(58) Field of Classification Search
CPC ...... G06F 9/44505; H04L 67/02; H04L 67/10
USPC .......................................... 707/620; 713/100
See application file for complete search history.

(56) References Cited

U.S. PATENT DOCUMENTS 5,437,025 A 7/1995 Bale et al.
5,504,852 A 4/1996 Thompson-Rohrlich
(Continued)

FOREIGN PATENT DOCUMENTS

CN 1599901 A 3/2005
CN 1801086 A 7/2006
(Continued)

OTHER PUBLICATIONS

Third Chinese Office Action cited in Chinese Application No. 200980110676.3 dated Aug. 30, 2013, 7 pgs.
(Continued)

*Primary Examiner* — Jorge A Casanova
(74) *Attorney, Agent, or Firm* — Bryan Webster; Katherine Drakos; Micky Minhas

(57) ABSTRACT

Within a computing environment, an application may run in a variety of contexts, e.g., as a natively executable application, as a client-side interpretable application embedded in a web browser, or as a server-side application that communicates with the user through a web interface presented on a device. The application may also access resources of the computing environment stored on multiple devices. The configuration of the application to operate equivalently in these diverse environments may be facilitated by representing the application within an object hierarchy representing the computing environment. The application may be configured to operate on the objects of the object hierarchy regardless of the location of the stored objects, to execute on any device, and to execute upon a standard set of application programming interfaces. The configuration of the application in this manner promotes the versatility of the application in operating equivalently in different programming contexts.

20 Claims, 7 Drawing Sheets

(56) References Cited

U.S. PATENT DOCUMENTS

| | | |
|---|---|---|
| 5,548,726 A | 8/1996 | Pettus |
| 5,850,090 A | 12/1998 | Oashi et al. |
| 5,930,156 A | 7/1999 | Kennedy |
| 5,983,234 A | 11/1999 | Tietjen et al. |
| 6,105,062 A | 8/2000 | Andrews et al. |
| 6,137,493 A | 10/2000 | Kamimura et al. |
| 6,209,029 B1 | 3/2001 | Epstein et al. |
| 6,243,746 B1 | 6/2001 | Sondur et al. |
| 6,286,138 B1 | 9/2001 | Purcell |
| 6,330,717 B1 | 12/2001 | Raverdy et al. |
| 6,374,252 B1 | 4/2002 | Althoff et al. |
| 6,496,979 B1 * | 12/2002 | Chen et al. .................... 717/178 |
| 6,546,554 B1 | 4/2003 | Schmidt et al. |
| 6,573,907 B1 | 6/2003 | Marane |
| 6,594,664 B1 | 7/2003 | Estrada et al. |
| 6,662,192 B1 | 12/2003 | Rebane |
| 6,678,724 B2 | 1/2004 | Nakajima et al. |
| 6,685,090 B2 | 2/2004 | Nishigaya et al. |
| 6,732,172 B1 | 5/2004 | House et al. |
| 6,836,842 B1 | 12/2004 | Guccione et al. |
| 6,907,451 B1 | 6/2005 | Mukundan et al. |
| 6,909,721 B2 | 6/2005 | Ekberg et al. |
| 6,941,306 B2 | 9/2005 | Kim |
| 6,952,714 B2 | 10/2005 | Peart |
| 6,968,535 B2 | 11/2005 | Stelting et al. |
| 7,013,340 B1 | 3/2006 | Burd et al. |
| 7,054,927 B2 | 5/2006 | Ulrich et al. |
| 7,088,995 B2 | 8/2006 | Rao |
| 7,089,295 B2 | 8/2006 | Christfort et al. |
| 7,099,888 B2 | 8/2006 | Gollapudi et al. |
| 7,117,243 B2 | 10/2006 | Peart |
| 7,117,495 B2 | 10/2006 | Blaser et al. |
| 7,146,524 B2 | 12/2006 | Patel et al. |
| 7,149,959 B1 | 12/2006 | Jones et al. |
| 7,203,485 B2 | 4/2007 | Coppinger et al. |
| 7,240,327 B2 | 7/2007 | Singh et al. |
| 7,266,370 B2 | 9/2007 | Paddon et al. |
| 7,266,563 B2 | 9/2007 | Morris et al. |
| 7,284,196 B2 | 10/2007 | Skeen et al. |
| 7,330,872 B2 | 2/2008 | Peart et al. |
| 7,353,259 B1 | 4/2008 | Bakla et al. |
| 7,406,542 B2 | 7/2008 | Eringsson |
| 7,483,978 B2 | 1/2009 | Esfahany et al. |
| 7,577,681 B1 | 8/2009 | Rozenman et al. |
| 7,681,134 B1 * | 3/2010 | Grechishkin et al. ......... 715/740 |
| 7,836,458 B1 | 11/2010 | Gwozdz et al. |
| 7,890,543 B2 | 2/2011 | Hunt et al. |
| 8,185,891 B2 | 5/2012 | DeHaan |
| 8,290,762 B2 | 10/2012 | Kodosky et al. |
| 2001/0044801 A1 | 11/2001 | Senn et al. |
| 2002/0010807 A1 | 1/2002 | Multer et al. |
| 2002/0029227 A1 | 3/2002 | Multer et al. |
| 2002/0040368 A1 | 4/2002 | Schreiber |
| 2002/0103811 A1 | 8/2002 | Fankhauser et al. |
| 2002/0133669 A1 | 9/2002 | Devireddy et al. |
| 2002/0138617 A1 | 9/2002 | Christfort et al. |
| 2002/0194045 A1 | 12/2002 | Shay et al. |
| 2003/0004746 A1 | 1/2003 | Kheirolomoom et al. |
| 2003/0033308 A1 | 2/2003 | Patel et al. |
| 2003/0063134 A1 | 4/2003 | Lord et al. |
| 2003/0071857 A1 | 4/2003 | Arrouye et al. |
| 2003/0074393 A1 | 4/2003 | Peart |
| 2003/0177121 A1 | 9/2003 | Moona et al. |
| 2003/0233376 A1 | 12/2003 | Bussler et al. |
| 2003/0233383 A1 * | 12/2003 | Koskimies .................... 707/204 |
| 2003/0236917 A1 | 12/2003 | Gibbs et al. |
| 2004/0006566 A1 | 1/2004 | Taylor et al. |
| 2004/0031029 A1 | 2/2004 | Lee et al. |
| 2004/0085947 A1 | 5/2004 | Ekberg et al. |
| 2004/0103071 A1 | 5/2004 | Kalia et al. |
| 2004/0111515 A1 | 6/2004 | Manion et al. |
| 2004/0133589 A1 | 7/2004 | Kiessig et al. |
| 2004/0148525 A1 | 7/2004 | Aida et al. |
| 2004/0153568 A1 | 8/2004 | Ho et al. |
| 2004/0199572 A1 | 10/2004 | Hunt et al. |
| 2004/0201604 A1 | 10/2004 | Kraenzel et al. |
| 2004/0236801 A1 | 11/2004 | Borden et al. |
| 2004/0251568 A1 | 12/2004 | Chao et al. |
| 2005/0004978 A1 | 1/2005 | Reed et al. |
| 2005/0004985 A1 | 1/2005 | Stochosky |
| 2005/0021847 A1 | 1/2005 | Rothman et al. |
| 2005/0060315 A1 | 3/2005 | Sanin |
| 2005/0060581 A1 | 3/2005 | Chebolu et al. |
| 2005/0062581 A1 | 3/2005 | Koyama |
| 2005/0091575 A1 | 4/2005 | Relyea et al. |
| 2005/0102635 A1 | 5/2005 | Jiang et al. |
| 2005/0102678 A1 | 5/2005 | Hunt et al. |
| 2005/0124771 A1 | 6/2005 | Fukita et al. |
| 2005/0138156 A1 | 6/2005 | Gebhart et al. |
| 2005/0177600 A1 | 8/2005 | Eilam et al. |
| 2005/0192962 A1 | 9/2005 | Furrer et al. |
| 2005/0203931 A1 | 9/2005 | Pingree et al. |
| 2005/0251786 A1 | 11/2005 | Citron et al. |
| 2005/0251812 A1 | 11/2005 | Hayward |
| 2005/0289454 A1 | 12/2005 | Donelson et al. |
| 2006/0015538 A1 | 1/2006 | LeTourneau |
| 2006/0015936 A1 | 1/2006 | Illowsky et al. |
| 2006/0036602 A1 | 2/2006 | Unangst et al. |
| 2006/0037007 A1 | 2/2006 | Snyder et al. |
| 2006/0080353 A1 | 4/2006 | Miloushev et al. |
| 2006/0089965 A1 | 4/2006 | Fontes et al. |
| 2006/0117073 A1 | 6/2006 | Bosworth |
| 2006/0123010 A1 | 6/2006 | Landry et al. |
| 2006/0129972 A1 | 6/2006 | Tyburski et al. |
| 2006/0130050 A1 | 6/2006 | Betts et al. |
| 2006/0143435 A1 | 6/2006 | Kwon |
| 2006/0143601 A1 | 6/2006 | Concha et al. |
| 2006/0206533 A1 | 9/2006 | MacLaurin et al. |
| 2006/0224632 A1 | 10/2006 | Franz |
| 2006/0253849 A1 | 11/2006 | Avram et al. |
| 2007/0005613 A1 | 1/2007 | Singh et al. |
| 2007/0028175 A1 | 2/2007 | Moore et al. |
| 2007/0038642 A1 | 2/2007 | Durgin et al. |
| 2007/0061349 A1 | 3/2007 | Morgan et al. |
| 2007/0073770 A1 | 3/2007 | Morris et al. |
| 2007/0100834 A1 | 5/2007 | Landry et al. |
| 2007/0106650 A1 | 5/2007 | Moore |
| 2007/0118560 A1 | 5/2007 | Bornhoevd et al. |
| 2007/0150480 A1 | 6/2007 | Hwang et al. |
| 2007/0156842 A1 * | 7/2007 | Vermeulen et al. ........... 709/217 |
| 2007/0169049 A1 | 7/2007 | Gingell et al. |
| 2007/0180043 A1 | 8/2007 | Vernat et al. |
| 2007/0209066 A1 | 9/2007 | Timmerman |
| 2007/0266136 A1 | 11/2007 | Esfahany et al. |
| 2007/0280165 A1 | 12/2007 | Doshi et al. |
| 2007/0294366 A1 | 12/2007 | Ozzie et al. |
| 2008/0016505 A1 | 1/2008 | Bucklew et al. |
| 2008/0040511 A1 | 2/2008 | Messer et al. |
| 2008/0057992 A1 | 3/2008 | Griffin |
| 2008/0059912 A1 | 3/2008 | Scherpa et al. |
| 2008/0092109 A1 | 4/2008 | Kinnucan et al. |
| 2008/0130639 A1 | 6/2008 | Costa-Requena et al. |
| 2008/0147716 A1 | 6/2008 | Omoigui |
| 2008/0155523 A1 | 6/2008 | Kornmann |
| 2008/0201453 A1 | 8/2008 | Assenmacher |
| 2008/0249994 A1 | 10/2008 | Passmore |
| 2008/0276181 A1 | 11/2008 | Moromisato et al. |
| 2009/0083425 A1 | 3/2009 | Bozak et al. |
| 2009/0164987 A1 | 6/2009 | Scholz et al. |
| 2009/0210421 A1 | 8/2009 | Shuhan |
| 2009/0240698 A1 | 9/2009 | Shukla et al. |
| 2009/0240935 A1 | 9/2009 | Shukla |

FOREIGN PATENT DOCUMENTS

| | | |
|---|---|---|
| JP | 2000242541 A | 9/2000 |
| JP | 2002229902 A | 8/2002 |
| WO | 0108051 A1 | 2/2001 |
| WO | 2005072114 A2 | 8/2005 |
| WO | 2007082005 A2 | 7/2007 |
| WO | 2007083299 A2 | 7/2007 |

(56) References Cited

FOREIGN PATENT DOCUMENTS

OTHER PUBLICATIONS

Reply third Chinese Office Action cited in Chinese Application No. 200980110676.3 dated Oct. 31, 2013, 12 pgs.
Fourth Chinese Office Action cited in Chinese Application No. 200980110676.3 dated Mar. 7, 2014, 11 pgs.
Reply second Chinese Office Action cited in Chinese Application no. 200980110662.1 dated Feb. 28, 2013, 9 pgs.
Chinese Notice of Allowance cited in Chinese Application No. 200980110662.1 dated Jul. 5, 2013, 4 pgs.
Int. Search Report/WrittenOpinion cited in PCT Application No. PCT/US2009/035602 dated Oct. 1, 2009, 10 pgs.
Chinese Notice of Allowance cited in Chinese Application No. 200980112183.3 dated Jun. 24, 2013, 4 pgs.
Int. Search Report/Written Opinion cited in PCT Application No. PCT/US2008/062191 dated Oct. 21, 2008, 10 pgs.
Reply EP Communication cited in EP Application No. 08747323.7 dated Jan. 22, 2010, 8 pgs.
Australian Office Action cited in Australian Application No. 2008247683 dated Mar. 12, 2012, 3 pgs.
Reply Australian Office Action cited in Australian Application No. 2008247683 dated Apr. 12, 2012, 18 pgs.
Australian Notice of Allowance cited in Australian Application No. 2008247683 dated Apr. 18, 2012, 3 pgs.
Russian Office Action cited in Russian Application No. 2009140733 dated May 5, 2012, 1 pg.
Russian Notice of Allowance cited in Russian Application No. 2009140733 dated Dec. 20, 2012, 6 pgs.
EP Search Report cited in EP Application No. 09721256.7 dated Nov. 5, 2015, 12 pgs.
"Amazon Simple Storage Service (Amazon S3)", 2007, reprinted from the Internet at: http://www.amazon.com/gp/browse.html?node=16427261, 5 pgs.
"Can Microsoft's 'Harmonica' create P2P harmony across all devices?", Mary Jo Foley, Dec. 18, 2006, reprinted from the Internet at: http://blogs.zdnet.com/microsoft/?p=157, 2 pgs.
"Digestor: Device-independent Access to the World Wide Web", Timothy W. Bickmore and Bill N. Schilit, 2000, reprinted from the Internet at: http://decweb.ethz.ch/WWW6/Technical/Paper177/Paper177.html, 10 pgs.
"Distributed Data Storage Based on Web Access and IBP Infrastructure", Lukas Hejtmanek, May 14, 2004, in Data Processing and Storage Networking: Towards Grid Computing. Technical Proceedings. The Third IFIP-TC6 Networking Conference, Athens, Greece, 8 pgs.
"Google Data APIs (Beta) Developer's Guide" Google Data APIs Overview, 2007, reprinted from the Internet at: http://code.google.com/apis/gdata/overview.html, 2 pgs.
"Grid Enabled Relational Database Middleware" Wolfgang Hoschek and Gavin McCance, Oct. 2001, reprinted from the Internet at: http://www.cs.northwestern.edu/~pdinda/relational-gis/hoschek_mccance_ggf3.pdf, 6 pgs.
"Grid Metadata Catalog Service-Based OGC Web Registry Service", Peisheng Zhao, Aijun Chen, Yang Liu, Liping Di, Wenli Yang and Peishuan Li, Nov. 12, 2004, Proceedings of the 12th Annual ACM International Workshop in Geographic Information Systems, 9 pgs.
"Linking in a Global Information Architecture", Karen R. Sollins and Jeffrey R. Van Dyke, Dec. 1995, VVWW4 Conference, Boston, MA., 18 pgs.
"Mapping Between JSON and XML", 2008, reprinted from the Internet at: https://msdn.microsoft.com/en-us/library/bb924435(v=vs.110).aspx, 1 pg.
"Microsoft Aims to Mesh Disparate Calendars, Contacts", Lisa Vaas, Nov. 21, 2005, reprinted from the Internet at: http://www.eweek.com/c/a/Messaging-and-Collaboration/Microsoft-Aims-to-Mesh-Disparate-Calendars-Contacts, 4 pgs.
"MobiShare: Sharing Context-Dependent Data & Services from Mobile Sources", Efstratios Valavants, Christopher Ververidis, Michalis Vazirgianis, George C. Polyzos and Kjetil Narvag, 2003, Proceedings of the IEEE/WIC International Conference on Web Intelligence, 8 pgs.
"Multi-protocol Web Services for enterprises and the Grid", N. Mukhi, R. Khalaf and P. Fremantle, 2002, in Proceedings of the EuroWeb 2002 Conferences in the Web, 10 pgs.
"Convert XML to JSON in PHP", Senthil Nathan, Edward J. Pring and John Morar, Jan. 16, 2007, reprinted from the Internet at: http://www.ibm.com/developerworks/library/x-xml2jsonphp/index.html, 10 pgs.
"PCI Express and Advanced Switching: Data Movement Protocols", Tim Miller, Oct. 2003, reprinted from the Internet at: http://www.rtcmagazine.com/articles/view/100148, 4 pgs.
"Providing web services to mogile users: the architecture design of an m-service portal", Minder Chen, 2005, Int. J. Mobile Communications, vol. 3 No. 1, 18 pgs.
"Synchronizing Data between WinFS Stores", Jan. 25, 2006, reprinted from the Internet at: http://blogs.msdn.com/b/winfs/archive/2006/01/25/517674.aspx, 4 pgs.
The Ninja architecture for robust Internet-scale systems and services, Steven D. Gribble, Matt Welsh, Rob Von Behren, Eric A. Brewer, David Culler, N. Aorisov, S. Czerwinski, R. Gumadi, J. Hill, A Joseph, R.H. Katz, Z.M. Mao, S. Ross and B. Zhao, 2001, Computer Networks 35, pp. 473-497.
VeriSign Unified Authentication Service, 2005, reprinted from the Internet at: htip://www.itsecurity.com/security.htm?s=7389, 3 pgs.
"WebSplitter: A Unified XML Framework for Multi-Device Collaborative Web Browsing", Richard Han, Veronique Perret and Mahmoud Naghshineh, 2000, Appeard in ACM Conference on Computer Supported Cooperative Work, 10 pgs.
Non-Final Office Action cited in U.S. Appl. No. 11/744,777 dated Mar. 10, 2010, 14 pgs.
Reply Non-Final Office Action cited in U.S. Appl. No. 11/744,777 dated Jun. 10, 2010, 14 pgs.
Restriction/Election Office Action cited in U.S. Appl. No. 11/744,777 dated Dec. 1, 2009, 6 pgs.
Reply Restriction/Election Office Action cited in U.S. Appl. No. 11/744,777 dated Dec. 22, 2009, 9 pgs.
Notice of Allowance cited in U.S. Appl. No. 11/744,777 dated Aug. 17, 2010, 14 pgs.
Non-Final Office Action cited in U.S. Appl. No. 12/052,534 dated May 25, 2011, 31 pgs.
Reply Non-Final Office Action cited in U.S. Appl. No. 12/052,534 dated Jun. 30, 2011, 20 pgs.
Final Office Action cited in U.S. Appl. No. 12/052,534 dated Aug. 16, 2011, 20 pgs.
Reply Final Office Action cited in U.S. Appl. No. 12/052,534 dated Nov. 16, 2011, 17 pgs.
Notice of Allowance cited in U.S. Appl. No. 12/052,534 dated Jun. 25, 2013, 15 pgs.
Non-Final Office Action cited in U.S. Appl. No. 12/052,550 dated Aug. 8, 2011, 21 pgs.
Reply Non-Final Office Action cited in U.S. Appl. No. 12/052,550 dated Nov. 8, 2011, 17 pgs.
Final Office Action cited in U.S. Appl. No. 12/052,550 dated Mar. 2, 2012, 30 pgs.
Reply Final Office Action cited in U.S. Appl. No. 12/052,550 dated Sep. 4, 2012, 21 pgs.
Non-Final Office Action cited in U.S. Appl. No. 12/052,550 dated Dec. 21, 2012, 57 pgs.
Reply Non-Final Office Action cited in U.S Appl. No. 12/052,550 dated Mar. 21, 2013, 18 pgs.
Final Office Action cited in U.S. Appl. No. 12/052,550 dated Jul. 19, 2013, 85 pgs.
Response after Final Office Action cited in U.S. Appl. No. 12/052,550 dated Dec. 19, 2013, 11 pgs.
Non-Final Office Action cited in U.S. Appl. No. 12/052,554 dated Aug. 5, 2010, 39 pgs.
Reply Non-Final Office Action cited in U.S. Appl. No. 12/052,554 dated Nov. 4, 2010, 23 pgs.
Final Office Action cited in U.S. Appl. No. 12/052,554 dated Jan. 25, 2011, 43 pgs.

(56) References Cited

OTHER PUBLICATIONS

Reply Final Office Action cited in U.S. Appl. No. 12/052,554 dated Apr. 7, 2011, 28 pgs.
Final Office Action cited in U.S. Appl. No. 12/052,554 dated Mar. 30, 2012, 44 pgs.
Response after Final Office Action cited in U.S. Appl. No. 12/052,554 dated Jul. 2, 2012, 15 pgs.
Notice of Allowance cited in U.S. Appl. No. 12/052,554 dated Aug. 6, 2012, 17 pgs.
Notice of Allowance cited in U.S. Appl. No. 12/052,554 dated Mar. 12, 2013, 12 pgs.
Non-Final Office Action cited in U.S. Appl. No. 12/052,556 dated Feb. 17, 2011, 22 pgs.
Reply Non-Final Office Action cited in U.S. Appl. No. 12/052,556 dated May 16, 2011, 20 pgs.
Final Office Action cited in U.S. Appl. No. 12/052,556 dated Aug. 5, 2011, 23 pgs.
Reply Final Office Action cited in U.S. Appl. No. 12/052,556 dated Nov. 7, 2011, 19 pgs.
Non-Final Office Action cited in U.S. Appl. No. 12/052,556 dated Nov. 1, 2013, 15 pgs.
Reply Non-Final Office Action cited in U.S. Appl. No. 12/052,556 dated Feb. 3, 2014, 15 pgs.
Final Office Action cited in U.S. Appl. No. 12/052,556 dated Apr. 4, 2014, 32 pgs.
Reply Final Office Action cited in U.S. Appl. No. 12/052,556 dated Jul. 7, 2014, 19 pgs.
Non-Final Office Action cited in U.S. Appl. No. 12/052,556 dated Sep. 10, 2014, 34 pgs.
Reply Non-Final Office Action cited in U.S. Appl. No. 12/052,556 dated Feb. 10, 2015, 20 pgs.
Notice of Allowance cited in U.S. Appl. No. 12/052,556 dated Apr. 1, 2015, 51 pgs.
Notice of Allowance cited in U.S. Appl. No. 12/052,556 dated Nov. 16, 2015, 59 pgs.
Non-Final Office Action cited in U.S. Appl. No. 12/057,000 dated Aug. 4, 2010, 21 pgs.
Reply Non-Final Office Action cited in U.S. Appl. No. 12/057,000 dated Nov. 4, 2010, 18 pgs.
Final Office Action cited in U.S. Appl. No. 12/057,000 dated Jan. 21, 2011, 22 pgs.
Reply Final Office Action cited in U.S. Appl. No. 12/057,000 dated Mar. 24, 2011, 22 pgs.
Non-Final Office Action cited in U.S. Appl. No. 12/057,000 dated Jul. 5, 2012, 10 pgs.
Reply Non-Final Office Action cited in U.S. Appl. No. 12/057,000 dated Nov. 5, 2012, 14 pgs.
Non-Final Office Action cited in U.S. Appl. No. 12/057,000 dated Jan. 16, 2013, 13 pgs.
Reply Non-Final Office Action cited in U.S. Appl. No. 12/057,000 dated Apr. 16, 2013, 16 pgs.
Final Office Action cited in U.S. Appl. No. 12/057,000 dated Jul. 18, 2013, 16 pgs.
Reply Final Office Action cited in U.S. Appl. No. 12/057,000 dated Oct. 18, 2013, 16 pgs.
Non-Final Office Action cited in U.S. Appl. No. 12/057,000 dated Jan. 30, 2015, 11 pgs.
Reply Non-Final Office Action cited in U.S. Appl. No. 12/057,000 dated Apr. 30, 2015, 17 pgs.
Final Office Action cited in U.S. Appl. No. 12/057,000 dated Jun. 3, 2015, 22 pgs.
Non-Final Office Action cited in U.S. Appl. No. 12/910,757 dated Dec. 2, 2011, 18 pgs.
Reply Non-Final Office Action cited in U.S. Appl. No. 12/910,757 dated Feb. 27, 2012, 11 pgs.
Notice of Allowance cited in U.S. Appl. No. 12/910,757 dated Jun. 21, 2012, 17 pgs.
Notice of Allowance cited in U.S. Appl. No. 12/910,757 dated Sep. 26, 2012, 23 pgs.
Int. Search Report/Written Opinion cited in PCT Application No. PCT/US2009/034442 dated Feb. 19, 2009, 12 pgs.
Int. Preliminary Report cited in PCT Application no. PCT/US2009/034442 dated Sep. 21, 2010, 4 pgs.
First Chinese Office Action cited in Chinese Application No. 200980110676.3 dated Jun. 5, 2012, 7 pgs.
Reply First Chinese Office Action cited in Chinese Application No. 200980110676.3 dated Oct. 23, 2012, 28 pgs.
Second Chinese Office Action cited in Chinese Application No. 200980110676.3 dated Mar. 4, 2013, 9 pgs.
Reply second Chinese Office Action cited in Chinese Application No. 200980110676.3 dated May 15, 2013, 6 pgs.
Int. Search Report cited in PCT Application No. PCT/US2009/034601 dated Sep. 21, 2010, 11 pgs.
Int. Preliminary Report cited in PCT Application No. PCT/US2009/034601 dated Sep. 21, 2010, 5 pgs.
First Chinese Office Action cited in Chinese Application No. 200980110662.1 dated Apr. 6, 2012, 6 pgs.
Reply first Chinese Office Action cited in Chinese Application No. 200980110662.1 dated Aug. 16, 2012, 6 pgs.
Second Chinese Office Action cited in Chinese Application No. 200980110662.1 dated Feb. 28, 2013, 9 pgs.
EP Search Report cited in EP Application No. 09723161.7 dated Oct. 4, 2011, 8 pgs.
EP Communication cited in EP Application No. 09723161.7 dated Oct. 21, 2011, 1 pg.
Reply EP Communication cited in EP Application No. 09723161.7 dated Dec. 23, 2011, 15 pgs.
EP Communication cited in EP Application No. 09723161.7 dated Mar. 8, 2012, 5 pgs.
Reply EP Communication cited in EP Application No. 09723161.7 dated Jul. 6, 2012, 13 pgs.
Int. Preliminary Report cited in PCT Application No. PCT/US2009/035602 dated Sep. 28, 2010, 6 pgs.
First Chinese Office Action cited in Chinese Application No. 200980112183.3 dated Apr. 12, 2012, 6 pgs.
Reply First Chinese Office Action cited in Chinese Application No. 200980112183.3 dated Aug. 17, 2012, 40 pgs.
Second Chinese Office Action cited in Chinese Application No. 200980112183.3 dated Dec. 18, 2012, 6 pgs.
Reply second Chinese Office Action cited in Chinese Application No. 200980112183.3 dated Feb. 18, 2013, 14 pgs.
Int. Preliminary Report cited in PCT Application No. PCT/US2008/062191 dated Nov. 10, 2009, 8 pgs.
First Chinese Office Action cited in Chinese Application No. 200880014431.6 dated Mar. 22, 2011, 10 pgs.
Reply first Chinese Office Action cited in Chinese Application No. 200880014431.6 dated Jun. 29, 2011, 15 pgs.
Third Chinese Office Action cited in Chinese Application No. 200880014431.6 dated Jul. 6, 2012, 9 pgs.
Reply third Chinese Office Action cited in Chinese Application No. 200880014431.6 dated Jul. 24, 2012, 13 pgs.
Fourth Chinese Office Action cited in Chinese Application No. 200880014431.6 dated Oct. 29, 2012, 9 pgs.
Reply fourth Chinese Office Action cited in Chinese Application No. 200880014431.6 dated Nov. 20, 2012, 13 pgs.

* cited by examiner

VERSATILE APPLICATION CONFIGURATION FOR DEPLOYABLE COMPUTING ENVIRONMENTS

CROSS REFERENCE TO RELATED APPLICATIONS

This patent application claims the benefit for priority under 35 U.S.C. 120 of U.S. patent application Ser. No. 12/052,534 ("Versatile Application Configuration for Deployable Computing Environments"), filed on Mar. 20, 2008, which is incorporated by reference as if fully rewritten herein.

BACKGROUND

Many computing environments comprise a large and diverse set of objects managed by a set of object systems. For example, a computing environment may comprise a set of files managed by a file system, one or more databases managed by a database system, a set of executable binaries representing applications and managed by an assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such objects may be exchanged among a plurality of devices operated by one or more users, and according to one or more operations (e.g., an object synchronization operation that merges two object sets and an object mirroring operation that adjusts a target object set to match a source object set.) In this manner, the objects are loosely organized through a set of object systems and aggregated to represent the computing environment.

The applications available within contemporary computing environments are typically devised and presented to the user according to many contexts. A locally deployed application typically operates on a local device and often utilizes one or more application programming interfaces for functions such as graphics rendering, memory access, window management, and network communication with remote resources. A server-side web application typically operates on a remote resource, such as a remote webserver, and communicates with a user of a local device through a client interface, such as a web browser. A client-side web-deployed application is typically stored as a set of resources on a remote server, sent to a local device upon request, and executed on the device. Such client-side web-deployed applications may run within a web browser, or may be configured to run as a locally deployed application; for instance, a Java or XAML application may be sent to a device, locally compiled or interpreted, and executed similarly to other locally deployed applications. Some applications have features of multiple contexts; for instance, an email service suite may have a server-side portion that receives mail and filters spam, and may offer users a choice between a locally deployed email application and a webmail interface to the mailbox that operates in a browser. Thus, a typical computing environment often manifests as an aggregation of applications presented according to various contexts, each of which may have a particular set of conventions. For instance, an application state of a web application may be bookmarkable, while a locally deployed application may not offer such functionality; and a locally deployed application may have greater access to local resources, such as a local file system, than a web application constrained by browser- and network-based security processes.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The organization of objects within a computing system as a disjointed, loosely aggregated set of object systems may create several problems. For example, it may be difficult to present a consistent computing environment to the user through various devices, especially if the devices vary in capabilities (e.g., a high-performance personal workstation, a browser-based public terminal, and a low-performance cellphone device.) As another example, applying services to the objects, such as synchronization and backup, may involve interfacing with each object system to affect the objects managed thereby, and such interfacing may vary among object systems. As a third example, relating a diverse set of objects (such as all of the objects comprising an application) may be difficult due to the incomplete cooperation of the managing object systems.

An alternative technique for representing the objects comprising the computing environment involves organizing the objects in an object hierarchy, which may be hosted by a computing environment host. If the objects are represented in a uniform manner and managed in a consistent way by an object system, a set of services may be devised to apply to all of the objects of the computing environment. Moreover, the object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.)

This computing environment may be rendered in several ways. A first device comprising a locally stored object hierarchy may render the entire computing environment. A second device may have access to a portion of a remotely stored object hierarchy, and may be permitted to receive and process applications of the computing environment as a client-side web-deployed application. A third device may be granted access to the entire computing environment through a web browser, and the applications may execute on the computing environment host while communicating with the user through the web browser of the third device. Thus, an application represented in the computing environment may have to operate in many contexts, such as a locally deployed application and a server-side web-based application.

However, it may be difficult to configure the application to run in various contexts. As one example, an application may feature an interface that is specially devised to run in one context (such as a client-side script executing in a web browser) that may be difficult to present in another context (such as a locally deployed application.) As another example, an application may have difficulty accessing a resource over a network connection; e.g., a locally deployed resource that depends on locally deployed application programming interfaces or assemblies in an assembly cache may be unable to operate in the comparative isolation of a web browser. As a result, many contemporary applications are configured only to run in one context, or are presented with several single-context versions (e.g., a first version configured to operate as a locally deployed application, a second version configured to operate as a client-side web application that executes in a web browser or as a locally deployed application, and a third version configured to operate as a server-side web application that communicates with the user through a web browser.)

Presented herein are techniques for configuring an application to run in multiple contexts, such as (e.g.) a locally deployed application, a web-deployed client-side application operating in a browser, and a server-side application that communicates with a user through a web browser. This contextual versatility may be achieved by configuring the application to operate predominantly on objects of the deployable object hierarchy, which may be accessible to the application in a similar form regardless of whether it is available on the same device or remotely accessed. As one example of this versatility, the application may reference the objects of the object hierarchy according to a common addressing model, and the associations may be configured for different contexts simply by updating the addresses to local or remote references. The application may also be serviced by an application runtime that provides access to a uniform application programming interface, regardless of whether the application is executing as a locally deployed application, as a client-side web-deployed application executing in a web browser or as a locally deployed application, or as a server-side web application with a web browser user interface. An application devised to support such versatility may be included in the object hierarchy, and may be diversely configured to match the manner in which the computing environment is rendered on a particular device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
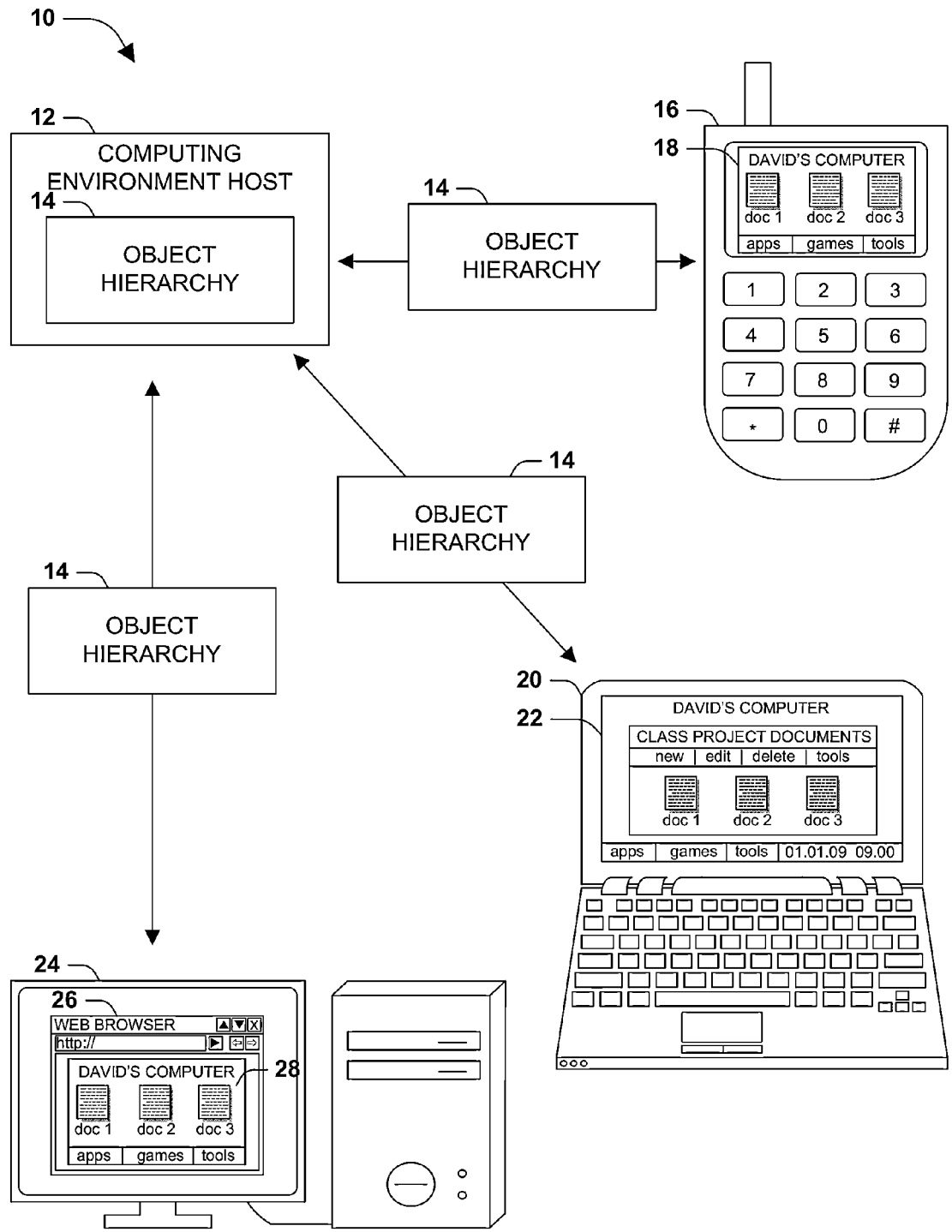
FIG. 1 is an illustration of an exemplary interaction of a computing environment host with various computing environment rendering devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Modern computer systems comprise a large number and variety of objects. Many computer systems feature a file store containing both the files for configuring the computer system (including executables, class libraries, configuration information sets, and resources) and user files generated or received by one or more users. Many computer systems also comprise a wide range of configuration information comprising the computer system hardware and software, including the hardware and devices of the computer system, the operating system, the shell user interface, and the configuration of the applications available within the shell user interface. Various user profiles and accounts may also exist, the former comprising information describing a particular user or user class (name, shell user interface preferences, home directory, etc.), and the latter comprising information describing the privileges of the user or class (file ownership, read/write privileges, access to various devices, etc.) Protected security information, such as passwords, certificates, public/private key pairs, and access control lists, may be stored in a security object, over which the operating system may exert regulated access. One or more data caches may exist, such as browser caches and histories, recent entries in application or browser textboxes, and recently used file and object lists. Various applications may create application- or task-specific archives, such as an email archive containing various folders and messages and a shared address book containing contact information received from various sources by various system users and organized in user-defined groups. Finally, the computer system may be configured to exchange particular sets of information with other computers, users, and devices, such as objects to be synchronized and object sets to which access may be granted with various conditions (read/write privileges, ownership, quotas, etc.) Such object types are typically managed by various management systems (e.g., a file system, a system registry store, a user account management system, and an email system) within the computer system in an ad hoc manner, with little consistency or standardization of access methods or object organization.

The organization of objects within a computing system as a disjointed, loosely aggregated set of object systems may create several problems. As a first example, rendering and maintaining a consistent computing environment comprising a consistent set of objects (such as files, applications, user profiles, application configuration, data caches, etc.) may be very difficult, especially among devices of varying capabilities, such as a personal workstation, a public terminal, and a cellphone device. As a second example, applying services to the objects may be complicated by the storage of diverse objects in multiple object systems. For instance, locating objects matching a particular description (such as objects last modified within a particular time span) may involve querying for matching files through one or more file systems, matching database records through a database system, matching registry keys through a system registry, matching applications through an assembly cache, matching data cache items through various data caches, etc. Because such object systems often store the associated objects in non-standard ways, such as with parameters specific to the nature of the objects (e.g., examining file records through a file system journal, and examining database records through a data-specific timestamp), applying an operation to each the various object systems may be difficult. As a third example, because each object system is configured to manage a particular kind of object, relating and mixing the types of objects may be difficult. For instance, an application may comprise an executable binary stored in an assembly cache, some configuration information stored in a system registry, supplemental files (such as dictionaries for various languages) stored in a file system, and events (such as recently edited documents) stored in data caches. It may be difficult to represent an association of these object types in various systems, and to manipulate all such objects together (e.g., deleting all such objects in order to uninstall the application.) As a fourth example, the object set of the computer system may be distributed across several devices, and providing consistent access to the object sets may be complicated by the various configurations of the devices, the network capabilities of each device, and incompatibilities in the wire formats used by each device for exchanging data (e.g., a first device may be configured to exchange data according to an XML schema, and a second device may be configured to exchange data according to JSON.)

An alternative approach may be devised wherein the computing environment is represented in a manner that may be delivered to devices for rendering according to the capabilities of the device. The representation comprises a set of objects organized according to an object hierarchy and represented according to a common grammar. The objects include the data objects of the computer system, such as the user files and data created by the user. The objects also include the executable binaries and class libraries comprising the operating system components, such as the shell, and the applications offered therein. The object also include the information specifying the user interface of a computing environment, including shell preferences (e.g., visual themes, application launch menu, and double-click threshold), user accounts and privileges, security information (e.g., passwords, security tokens, and certificates), application binaries and configuration information, user data and metadata (e.g., file sharing information), and data caches (e.g., most-recently-used file lists and browser history.) Despite the various nature and uses of these objects, the objects are represented in a common manner in the object hierarchy, and may be arbitrarily organized in the hierarchy. Thus, in contrast with former systems comprising a set of isolated data stores, each containing one type of object (e.g., a file system containing files, a registry containing configuration information, and a data cache containing the browser history), the object hierarchy in this approach organizes all such objects in a common manner in the object hierarchy.

A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the canonical source of the information set, and thereby propagated to all other devices to which the information set is delivered. Also, the devices sharing the computing environment may be integrated through the shared information set, such that one device may interact with others that are identified in the information set; e.g., data stored on a first device may be accessed by a second device, and a first device may be controlled by a second device through a communications conduit. The information set may therefore identify the collection of devices that share the computing environment, along with the roles, capabilities, and resources of each device, to provide an integrated computing experience across a potentially large number and variety of devices.

FIG. 1 illustrates one such scenario 10, wherein the computing environment may be hosted by a computing environment host 12, which may store and manage an object hierarchy 14. The computing environment host 12 may also render the object hierarchy 14 in different ways on behalf of various devices, such as a cellphone device 16, a personal notebook computer 20, and a public workstation 24, and also on behalf of different types of users having different access privileges. The rendering of the computing environment therefore reflects a consistent computing environment across all devices that expose the same applications, user profiles, shell configuration, user data objects, etc. Thus, a user may access a full-featured version 22 of the computing environment through a high-performance notebook computer, a stripped-down version 18 of the computing environment on a low-power cellphone device 16, and a browser-compatible and privacy-oriented version 28 of the computing environment through a web browser 146 of a public terminal 24. To the extent that the capabilities of each such device support the rendering of the computing environment, a consistent user interface and data set may be presented due to the rendering of the object hierarchy 14 adjusted to the capabilities of each device. Updates to the computing environment may be propagated back to the computing environment host 12, and may be automatically synchronized with other devices. The various devices may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Moreover, the computing environment host 12 may apply services to the various objects comprising the object hierarchy 14, and the common format in which the objects are stored in the object hierarchy may facilitate consistent availability and application of the services regardless of the nature of the objects applied thereto.

However, the representation of the computing environment as an object hierarchy may create difficulties in executing applications, since the computing environment may execute in different contexts. For example, a high-performance device such as a notebook computer may render a full-featured representation 22 of the computing environment, and an application operating therein may execute directly on the notebook computer and may access the resources and data objects stored locally on the notebook computer. By contrast, a low-power cellphone device 18 may render a stripped-down version 18 of the computing environment, and an application operating therein may execute as a web-deployed, client-side context, and may execute either as a native application within the computing environment or within a web browser provided in the computing environment. Moreover, the low-power cellphone device 18 may contain only a portion of the object hierarchy 14, and the application may have to access some objects of the object hierarchy 14 locally and other portions through the computing environment host 12 or another device. As a third example, a public workstation 24 may render a strictly web-based version of the computing environment through a web browser; an application operating therein may execute wholly or largely on the computing environment host 12 and the objects of the object hierarchy 14 stored therein, and may communicate with the user only through a thin-client interface presented by a web browser.

Figure 2:
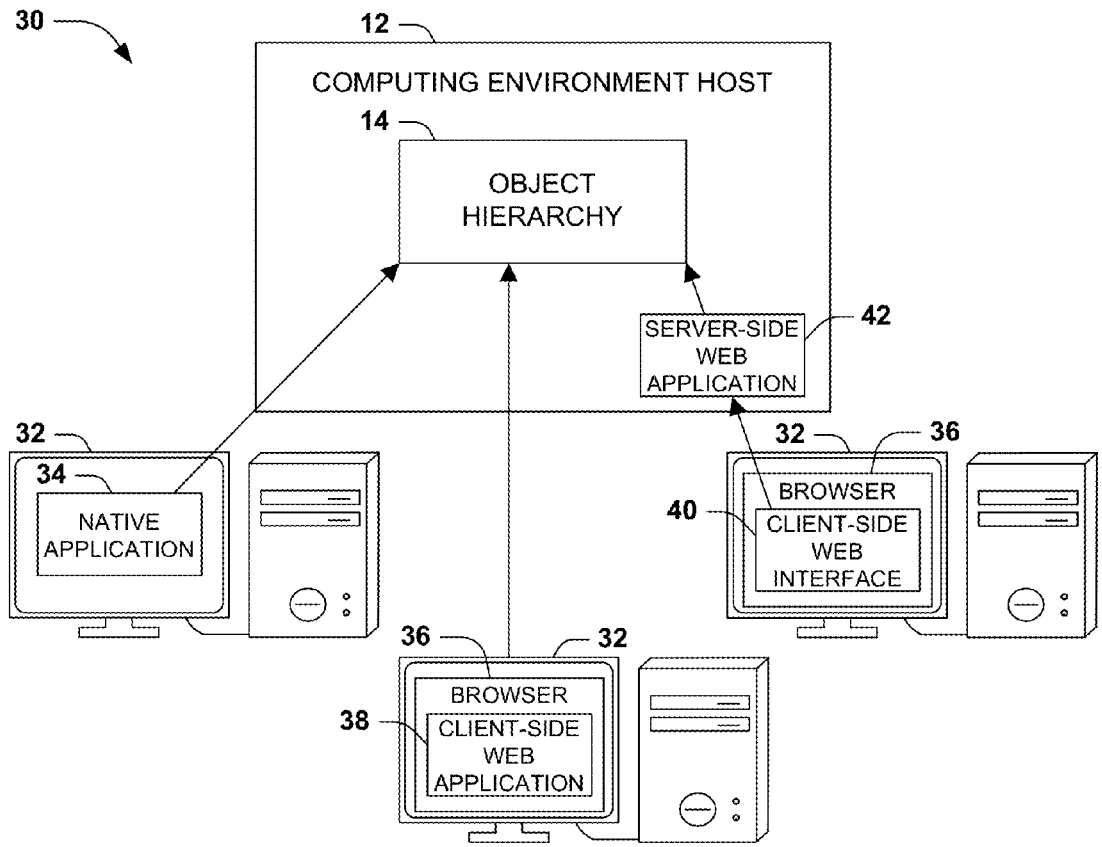
FIG. 2 is an illustration of an exemplary set of varying contexts in which an application may access an object hierarchy representing a computing environment.

FIG. 2 illustrates a first example 30 of an aspect of the application in which the execution may vary, relating to the execution context of the application. The application may be configured to operate within the computing environment represented by the object hierarchy 14 hosted by the computing environment host 12. As a first example, the application may be configured to execute on a workstation 32 as a native application 34 and operably coupled to the object hierarchy 14. As a second example, the application may be configured to execute on the workstation 32 within a web browser 36 as a web application 38 operably coupled to the object hierarchy 14, e.g., where the application comprises a client-side script. As a third example, the application may be configured to operate only as a client-side web interface 40 of a server-side web application 42 that executes on the computing environment host 12. It may be infrequent that an application is suitably flexible to operate equivalently in each context.

Figure 3:
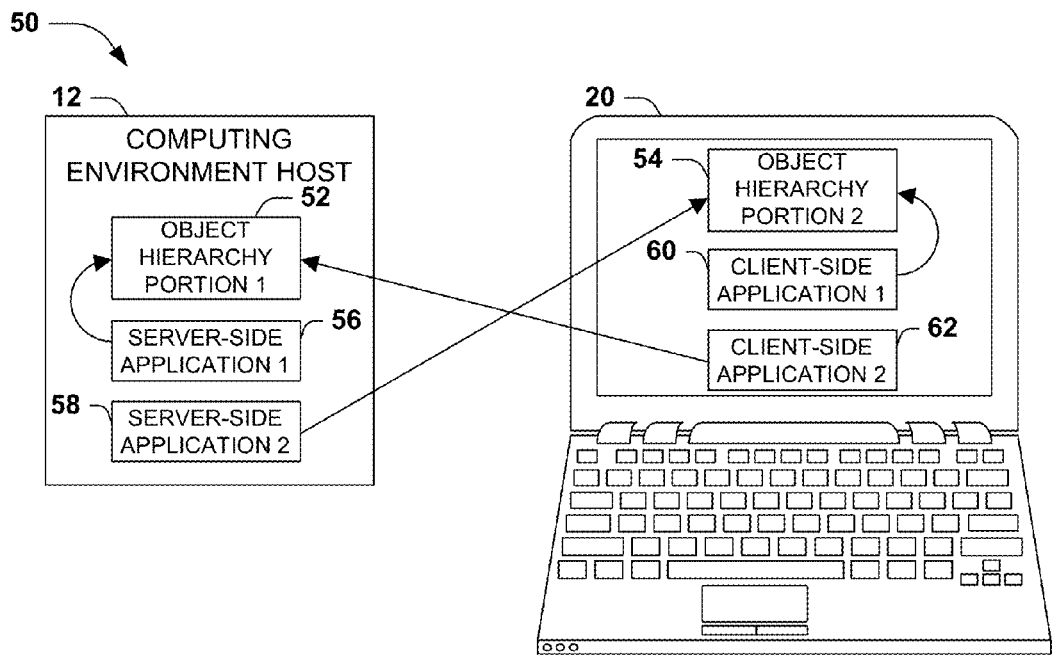
FIG. 3 is an illustration of another exemplary set of varying contexts in which an application may access an object hierarchy representing a computing environment.

FIG. 3 illustrates a second example 50 of an aspect of the application in which the execution may vary, relating to the location of the executing application and the location of an accessed portion of the object hierarchy. This second example 50 involves a computing environment host 52 configured to store a first object hierarchy portion 52, and a notebook computer 20 configured to store a second object hierarchy portion 54. As illustrated in this second example 50, a first application instance 56 may comprise a server-side application that operates on the computing environment host 12 and accesses the first object hierarchy portion 52 managed thereby, and that may send to a client device (such as the notebook computer 20) a web interface to the server-side application. A second application instance 58 may comprise a server-side application that also executes on the computing environment host 12, but that accesses the second object hierarchy portion 54 stored on the notebook computer 20. Conversely, a third application instance 60 may execute on the notebook computer 20 and may access the second object hierarchy portion 54, while a fourth application instance 62 also executing on the notebook computer 20 may access the first object hierarchy portion 52 managed by the computing environment host 12. Again, it may be is infrequent that an application is suitably flexible to operate equivalently in each location, and in varying conditions of the availability of the object hierarchy.

As a result of the contextual differences in which such applications may operate, the applications may exhibit different behaviors in different contexts. As a first example, a web browser that hosts a server-side web application or a web-deployed client-side application often has certain navigation properties, such as a navigation paradigm based on hyperlinks, an availability of "forward," "back," and "home" commands, and an ability to bookmark a page in order to store a state of the application. A user may also be accustomed to a delay between page loads, as this is a common navigation behavior among websites. By contrast, an application executing natively in a graphical computing environment (such as a windowing system) may exhibit a different navigation paradigm based on hierarchically organized dialog boxes accessible through a menu system, and users may be less tolerant of delays during transitions between application states. The user may not expect to find a bookmarking system in a natively running application, and may instead rely on saving and loading data objects to capture and restore the state of an application. As a second example, a web-browser-based application often exhibits certain visual properties, such as a common inline arrangement of text and a common vertical scrolling component, while an application executing natively in the windowing environment more often organizes controls in tab pages or child dialog windows and relies less on scrolling within dialogs. A web-browser-based application may also rely on lower-performance computational processes, such as graphics effects, as compared with higher-performance applications executing natively within the computing environment.

In addition, web-browser-based applications may exhibit different performance properties than a natively executing application. As a first example, a natively executing operation may run well whether or not the device can communicate with the computing environment host, or even if the device is not connected to a network; however, it may be considerably more difficult to configure a web application for equivalent online and offline execution. As a second example, many web-browser-based applications operate in a comparatively isolated context with restricted access to many local system resources, such as local storage, the system registry, and user profile information, while natively executing applications have less restricted access. This restriction may pertain to the location of the object hierarchy; for example, if a portion of the object hierarchy is stored on the device where the application is executing, a natively running application may be freely able to access the objects thereof, but a web-browser-based version of the application may be unable to access the objects. Similarly, a natively running application may be able to consume a greater amount of system resources, such as local storage and computation, than a web-browser-based application, which may be resource-restricted for security and performance motivations. Conversely, a web-browser-based application may be more readily implemented in a platform-independent manner than an application to be natively executed, which may depend more closely on a set of application programming interfaces exposed by a particular operating system. Also, a server-side web-based application may be more closely trusted by the hosting server and may be granted more service privileges to the hosting server than a client-side application, to which the server may attribute a lower scope of access. As a third example, an application may have different expectations with regard to a locally stored object hierarchy (e.g., if the application is executing on the computing environment host, or on a device to which the object hierarchy is available) than with regard to a remotely stored object hierarchy that is accessed over a network (e.g., an application running on a device and accessing a portion of the object hierarch on the computing environment host, or a server-side web application attempting to interact with a portion of an object hierarchy stored on a device.) For instance, rapid access to a high-bandwidth object, such as a high-definition video, may be readily achieved if stored in a locally accessible object hierarchy, but may be inadequately accessible for objects in a remotely stored object hierarchy.

Due to these many factors, application developers infrequently develop applications that may be equivalently executed in a variety of contexts. Instead, developers often target a particular context, such as a natively executing application, and design the resources of the computing environment with respect to that context. On occasion, a developer may choose to develop several versions of an application, each designed for a particular context; e.g., an email client developer may design both a natively executing email client version that is adapted to utilize a local email store, and a web-based email client version, such as a webmail client, that is adapted to access email through an email server and to communicate through a web browser interface. This approach often capitalizes on the differences among platforms, such as by utilizing a dialog-driven interface for a local application and hyperlinks for the webmail interface, and by implementing a search function via a server-based index for the webmail application but through an ad hoc search on a locally executing version.

It may be appreciated that these complexities arise, at least in part, from the difficulty in configuring an application to operate in a context-independent manner: as a native application or as a browser; with equivalent access to an object hierarchy stored locally or remotely; and while executing on a device or on a remote server such as a computing environment host. In conventional computer systems, it may be difficult for an application to interface with certain types of objects, such as a file system, the user profile for the current user, a system registry, and various types of system caches, in a platform-independent manner. Moreover, the application may have to make provisions for accessing resources locally or remotely; e.g., locally hosted objects might be accessible through a file system, while remotely hosted objects might involve a request via a URL, serialization, network transport, and deserialization.

However, several of these considerations may be addressed by or compatible with the representation of the computing environment as an object hierarchy. A versatile configuration of the application may promote the portability of the application and an equivalent execution and presentation in any contextual rendering of the computing environment, such as the various application contexts illustrated in FIGS. 2-3.

As a first aspect of these techniques, a device and a computing environment host may handle the task and details of enabling access to the object hierarchy. Rather than attempting to access diverse types of resources (files, user profiles, system registries, data caches, etc.) that may be stored on different devices and organized in platform-specific manners, the application may simply operate on objects within the object hierarchy. The task of identifying the location of an accessed object and of securing the requested access may be relegated to the components of the computing mesh. In addition to alleviating the application of the platform- and location-specific properties of the accessed objects, this technique may present other advantages. For example, the device and/or the computing environment host may analyze accesses to the object hierarchy stored in various locations, and may transparently improve the performance of such accesses by the application through caching and preloading. The device and computing environment may also handle the task of directing the object accesses to the locations on which the accessed portions of the object hierarchy are stored. Thus, the application may be designed simply to access the objects of the object hierarchy, regardless of location, and the computing mesh may properly route the requests, even if portions of the object hierarchy are relocated during use.

As a second aspect of these techniques, instead of being configured to execute in a platform- and context-dependent manner, the application may be configured to operate through a set of application programming interfaces that is equivalently implemented in various contexts, such as a native application, a web browser hosting a client-side web-deployed application, a server executing a server-side application, and a web browser hosting a client web interface to a server-side application. Thus, the application may simply be inserted into the object hierarchy, and may operate within the programmatic capabilities of the object hierarchy. The various devices and contexts embedded therein may be configured to provide a common platform that fulfills application programming interface invocations in an equivalent manner but within various contexts. For instance, the application may operate upon a common application runtime that is equivalently implemented for each context, and which achieves an equivalent execution behavior regardless of the operating context of the application. Again, in addition to alleviating the application of the platform-specific programming configuration, this technique may present additional advantages. For instance, the device and computing environment host may also cooperate to distribute the processing workload of the application in an efficient manner.

Figure 4:
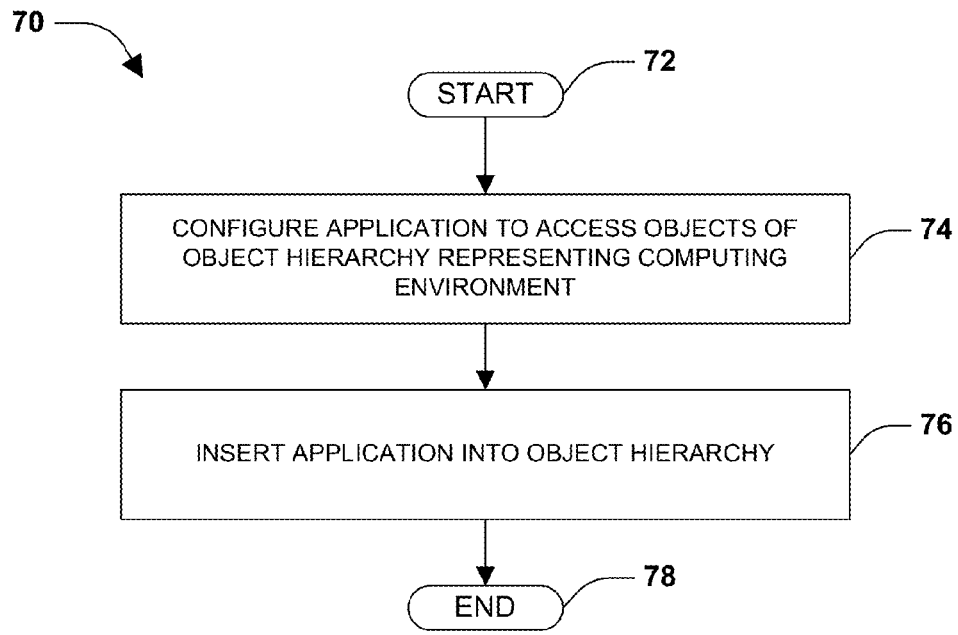
FIG. 4 is a flow chart illustrating an exemplary method of configuring an application to operate within a computing environment.

FIG. 4 illustrates one embodiment of these techniques, comprising an exemplary method 70 of configuring an application to operate within a computing environment. The exemplary method 70 begins at 72 and involves configuring 74 the application to access objects of an object hierarchy representing the computing environment. The exemplary method 70 also involves inserting 76 the application into the object hierarchy, so that the programmatic capabilities of the object hierarchy may be provided thereto. Having achieved the representation of the application in the object hierarchy and having applied the application to the objects of the computing environment as represented in the object hierarchy, the exemplary method 70 therefore achieves the configuration of the application to operate in a more platform-, location-, and context-independent manner, thereby promoting the versatility of the application; accordingly, the exemplary method 70 ends at 78.

Figure 5:
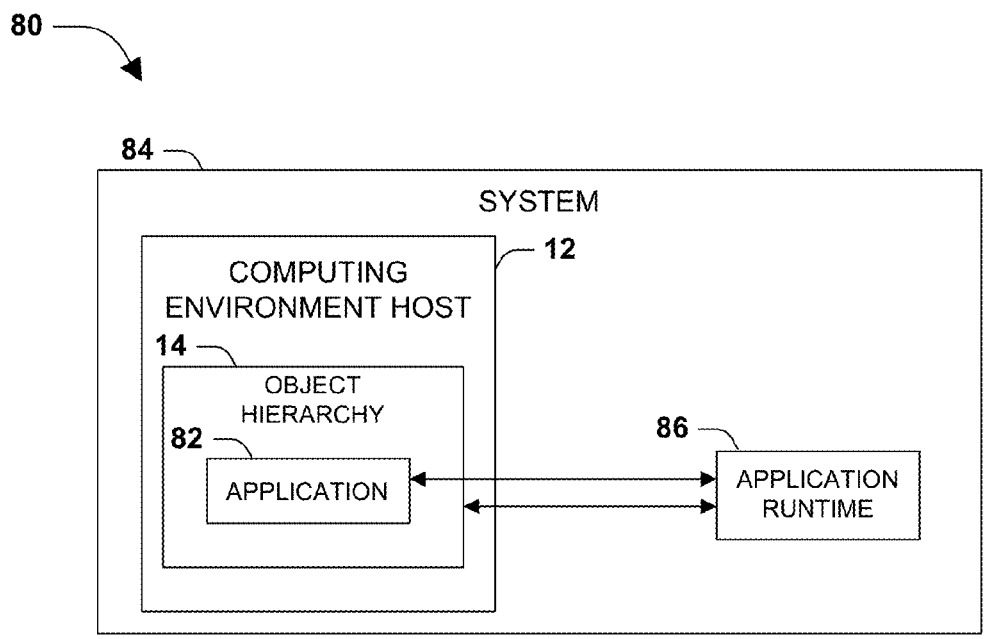
FIG. 5 is a component block diagram illustrating an exemplary system for configuring an application to operate within a computing environment.

FIG. 5 illustrates a second embodiment of these techniques, comprising a scenario 80 involving an exemplary system 84 for executing an application 82 represented in an object hierarchy 14 representing a computing environment. The exemplary system 84 comprises a computing environment host 12, which is configured to store the object hierarchy 14 (including the application 82), and an application runtime 86 configured to access objects of the object hierarchy 14 on behalf of the application 82. By permitting the application to operate upon the objects of the computing environment through the object hierarchy 82, and by permitting the application runtime 86 to provide a platform of standardized application programming interfaces, the exemplary system 84 thereby promotes the operation of the application in a platform-, location-, and context-independent manner.

The techniques described herein may be implemented with variations in many aspects, and some variations may present additional advantages and/or reduce disadvantages with respect to other variations of these and other techniques. These variations may be included in various embodiments, such as the exemplary method 70 of FIG. 4 and the exemplary system 84 of FIG. 5, and may be compatible with other such variations to present several such additional advantages and/or reduced disadvantages. Those of ordinary skill in the art may therefore devise many such embodiments in accordance with the techniques discussed herein.

A first aspect that may vary among implementations of these techniques relates to the contexts in which the application may be configured to operate as discussed herein. Such applications may be configured to in any of the contexts illustrated in FIGS. 2-3. As a first example, the application may be configured to execute natively, such as the native application 34 configured to execute on the workstation 32 in FIG. 2, or upon an application runtime configured to access the object hierarchy, such as may be provided by the operating system or by a web browser. As a second example, the application may be configured to access the objects of a locally stored object hierarchy available at a local address, or to access the objects of a remotely stored object hierarchy available at a remote address. As a third example, the application may be configured to execute on a computing environment host configured to store the object hierarchy, such as the first application instance 56 in FIG. 3 that is configured to operate on the computing environment host 12 storing the first object hierarchy portion 52, or the third application instance 60 configured to operate on the notebook computer 20 that also stores the second object hierarchy portion 54. Alternatively, the application may also be configured to access an object hierarchy stored on a first device and to execute on a second device, such as the second application instance 58 and the fourth application instance 62 in FIG. 3.

A second aspect that may vary among implementations of these techniques relates to the form of the application. As a first example, the application may be included in the object hierarchy as one or more source code documents, which may be compiled on a device prior to execution, or as an interpretable script, which may be interpretively executed on the device. This example may be advantageous by enabling many devices and platforms that can compile the source code or interpret the script to execute the application. This example may also be advantageous by allowing the device greater latitude to examine the source code or script, e.g., to examine the application for incompatible, problematic, or potentially malicious code. As a second example, the application may be included as a partially compiled binary, such as a compiler parse tree. This example may be advantageous by reducing the compilation burden on the device, while still permitting the device to compile the partially compiled binary into a platform-specific executable binary. As a third example, the application may be wholly compiled into a wholly compiled executable binary that is ready to execute on the device. This example may be advantageous where the device is low-powered and is not easily capable of including a compiler, or where the application is large and is not amenable to compilation on the device. The wholly compiled executable binary may only run on a subset of platforms; however, the object hierarchy may be configured to include a set of executable binaries for an application that are respectively compiled for a targeted platform. Those of ordinary skill in the art may be able to include the application in the object hierarchy in many forms while implementing the techniques discussed herein.

A third aspect that may vary among implementations of these techniques relates to the representation of the application in the object hierarchy. In accordance with the second aspect, the form in which the application is included in the object hierarchy may result in a binary object, a text-based object, or a hybrid thereof. These basic formats may then be represented in the object hierarchy in many ways. As a first example, the object may be included as an atomic data unit, such as a source code object encoded in the object hierarchy as plaintext or a binary object encoded in the object hierarchy through a binary serializing algorithm (e.g., Uuencode or MIME.) As a second example, the application may be represented in the object hierarchy as a set of individual data units, such as code modules, partially or wholly compiled binaries, a series of imperative instructions or declarative statements, a series of class definitions, etc. These sets of individual data units of the object may be semantically organized in many such ways, but the representation of the application in the object hierarchy may be organized according to a content- and semantic-independent representation that simply reflects the relationships among the data units. Thus, a representation grammar may be devised for representing various organizational relationships among the data units (e.g., a first data unit as a container of a second data unit, or of a series of such data units.) Moreover, the representation grammar may be recursively defined to permit deeper hierarchies of relationships, e.g., a series of one or more series of data items. Based on this recursable base representation format, the resources comprising the application may be stored in the object hierarchy in a well-organized but content-independent manner. As a third example, the representation of the application may be expressed according to a data interchange format chosen as an organizational syntax for the object hierarchy, such as JSON, Atom, or XML. Thus, embodiments of these techniques may include a deployment of the object hierarchy (or a portion of the object hierarchy that contains the application) to at least one device, wherein the application is represented in the object hierarchy according to a data interchange format. Those of ordinary skill in the art may be able to devise many representations of the application (regardless of its form) within the object hierarchy while implementing the techniques discussed herein.

A fourth aspect that may vary among implementations of these techniques relates to the addressing of the objects in the object hierarchy by the application. As discussed herein, the contextual versatility of the application may be improved by applying the application to the objects of an object hierarchy, instead of to the various types and locations of resources in the disjointed organization of a conventional computing environment (e.g., particular files in a file system and particular registry keys in a system registry.) If the application references an object at a particular address within the object hierarchy, the platform on which the application executes (e.g., the rendered computing environment hosting a natively executing application, an application runtime that is servicing the application, such as within a web browser application, and/or the computing environment host on which a server-side application is executing) may resolve the address to the current location of the object.

Figure 6:
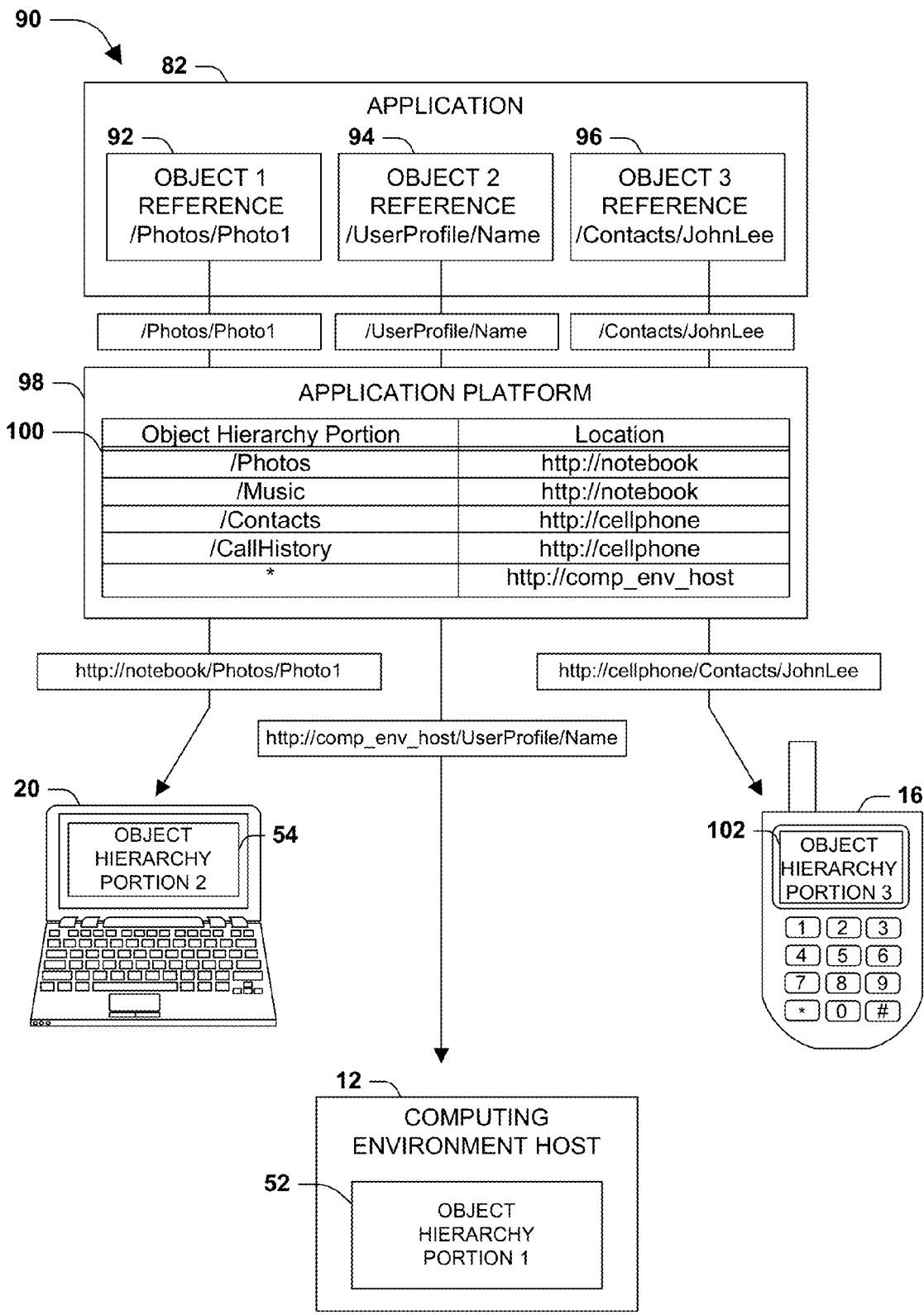
FIG. 6 is an illustration of an addressing model through which an application may be configured to access objects in an object hierarchy.

FIG. 6 presents an exemplary scenario 90 illustrating one suitable addressing model for the object hierarchy. In this exemplary scenario 90, the object hierarchy is distributed across three devices: the computing environment host 12 is configured to store a first object hierarchy portion 52, which includes the majority of the objects in the object hierarchy; a notebook computer 20 is configured to store a second object hierarchy portion 54, which includes a photo store comprising some photos that are represented in the object hierarchy; and a cellphone device 16 is configured to store a third object hierarchy portion 102, which includes some contact information.

In this exemplary scenario 90, the application 82 contains a first object reference 92 to a photo in a photo store that happens to be stored in the second object hierarchy portion 54; a second object reference 94 to the name of the local user stored in the user profile that happens to be stored in the first object hierarchy portion 52, and a third object reference 96 to contact information for an individual named John Lee that happens to be stored in the third object hierarchy portion 102. However, in this exemplary scenario 90, the application 82 does not directly address the devices on which the referenced objects are stored. Rather, the application 82 addresses the objects of the computing environment according to the address of the object within the object hierarchy, beginning with the root of the object hierarchy. The references may be redirected to the device currently storing the portion of the object hierarchy containing the referenced object. In this exemplary scenario 90, the application 82 communicates with the computing environment host 12 and the devices through an application platform 98, which may comprise (e.g.) an application runtime configured to service and facilitate the application 82. This application platform 98 contains a routing table 100, which may contribute to a completion of the object reference by prepending a base address for the device storing the referenced portion of the object hierarchy. Thus, the object hierarchy may have a base address, and respective objects of the object hierarchy may be available at an object address relative to the base address. The application 82 may then be configured to access the objects of the object hierarchy according to the object address relative to the base address. For instance, the first object reference 92 is evaluated by the application platform 98 according to the routing table 100, which indicates that references to objects in the object hierarchy beginning with /Photos are to be routed to the notebook computer 20. Accordingly, the relative address of the first object reference 92 (/Photos/Photo1) is prepended with a reference to the base address of the notebook computer (http://notebook) to produce an absolute address (http://notebook/Photos/Photo1).

The addressing model illustrated in the exemplary scenario 90 of FIG. 6 may have several advantages. As a first example, the addressing scenario illustrated in FIG. 6 is an application of a Uniform Resource Identifier (URI) hierarchical addressing model, which is well-understood and widely supported, e.g., as in the addressing of resources on the World Wide Web. As a second example, the and in furtherance of the versatility of the application 84, this referencing may obscure the location of the represented objects form the application 84. Thus, the application 84 may reference objects stored on the notebook computer 20 according to the relative address of the object (e.g., /Photos/Photo1)—regardless of whether the application 84 is also executing on the notebook computer 20 or on another device, such as the cellphone device 16. The application platform 98 may therefore determine how the relative address is to be completed. For instance, if the application is executing on the notebook computer 20, the address may be completed with an internal base address (e.g., http://localhost), whereas if the application is executing on the cellphone device 16, the address may be completed with a network-specific base address for the notebook computer 20 (e.g., an IP address, such as http://16.235.147.6). Moreover, the application 84 may successfully access portions of the object hierarchy even if it is relocated during the accessing; e.g., if a portion of the object hierarchy is moved from a first device to a second device, the references to the address within the application 84 may remain unchanged, but the routing table 100 of the application platform 98 may be updated to reflect the new location of the object hierarchy portion. Those of ordinary skill in the art may be able to devise many addressing models with various advantages with respect to the techniques discussed herein.

A fifth aspect that may vary among implementations of these techniques relates to the nature of the interaction between the application and the object hierarchy through one or both of a computing environment host and an application runtime. The object hierarchy may be exposed to the application as a large data structure, and the application may access the objects of the object hierarchy through object-level operators, such as Create, Read, Update, and Delete objects pertaining to common object operations. As a first example, the object hierarchy may be exposed through a File Transfer Protocol (FTP) model, wherein the application may navigate the object hierarchy in a file structure manner, and may read, write, and update objects. As a second example, the computing environment host may offer a web service or other remote invocation method to exchange data comprising the objects of the object hierarchy. As a third example, the object hierarchy may be exposed through an HTTP interface, and updates to the objects may be made through the standard HTTP verbs (POST, GET, PUT, and DELETE.) This access technique may be advantageous in at least three aspects. First, communicating through an HTTP interface may involve a standardized, well-understood, and widely supported communications protocol. Second, an HTTP interface may be particularly compatible with resources addressed as illustrated in FIG. 6, i.e., according to a URI addressing model. Third, these accessing and addressing techniques may be combined with some other principles, such as a stateless transaction model, to model the object hierarchy accessing according to a representational state transfer (RESTful) interface. However, those of ordinary skill in the art may be able to devise many object hierarchy interfaces, and to configure applications to utilize such interfaces, while implementing the techniques discussed herein.

Figure 7:
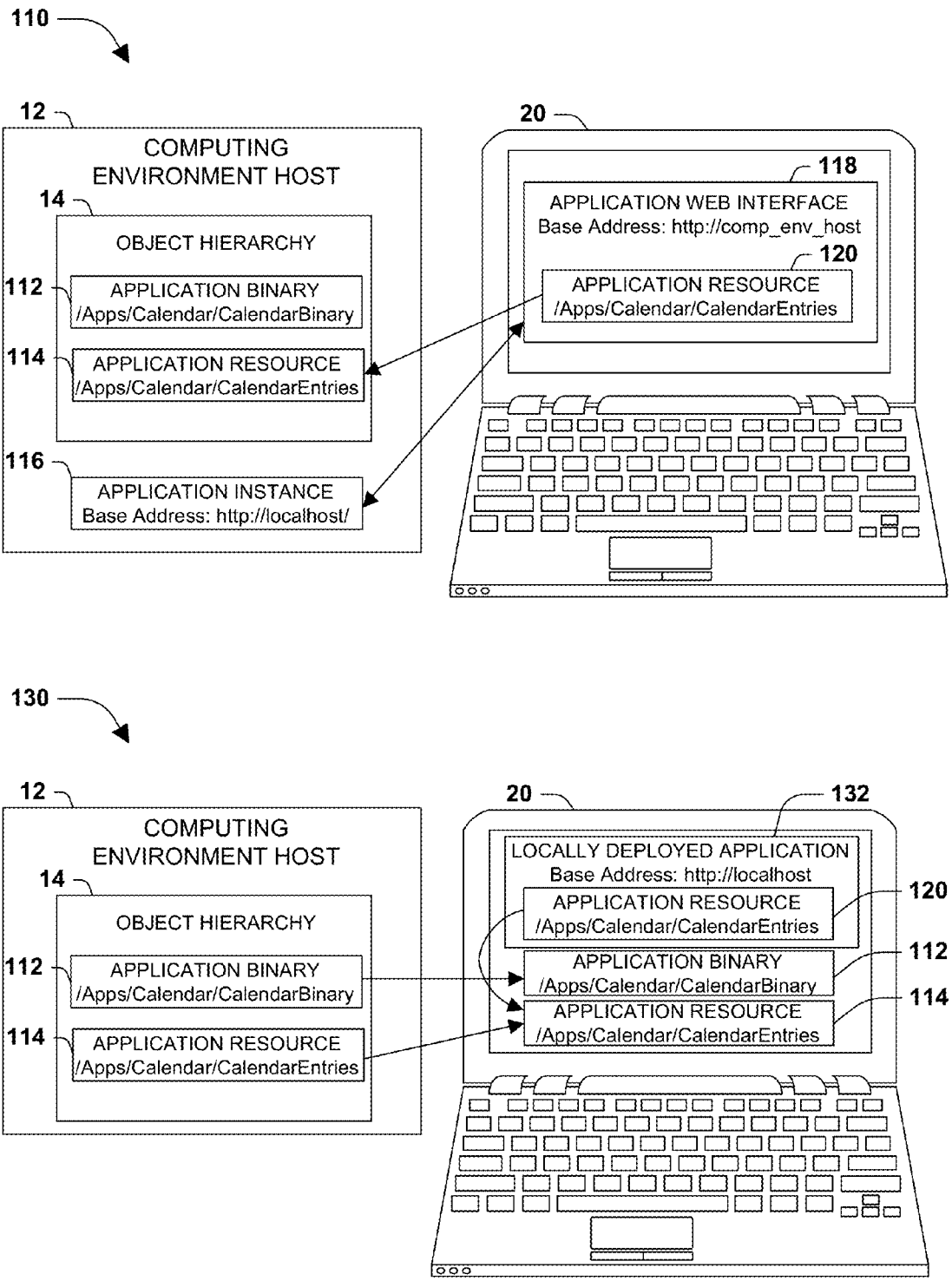
FIG. 7 is an illustration of some exemplary scenarios of computing environments in which applications may be configured to access objects in an object hierarchy.

In view of the foregoing aspects, FIG. 7 illustrates an exemplary configuration of an application to access the objects of an object hierarchy. In this scenario, the application may be instantiated either as a server-side application that executes on the computing environment host 12 and communicates with the user through a web interface displayed on a notebook computer 20, or as a locally deployed application that executes on the notebook computer 20 and accesses locally stored resources.

In the first exemplary configuration 110, the application is represented in an object hierarchy 14 on the computing environment host 12 as an application binary 112 and an application resource 114. These objects are provided relative addresses (in this scenario, URIs) within the object hierarchy 14. An application instance 116 may be invoked that operates on the computing environment host 12. The application instance 116 may contain a base address reference that directs the references of the application (such as to the application resource 114) to the local device, i.e., the computing environment host 12. The application instance 116 may also communicate with the user through a device, such as an application web interface 118 rendered on a notebook computer 20. The application web interface 118 may also include an application resource reference 120, and may access the application resource 114 through its address within the object hierarchy. However, because the application web interface 118 also contains a base address reference pointing to the computing environment host 12 on which the application instance 116 is executing, the application resource reference 120 is properly directed to the computing environment host 12. Thus, the application may operate in a server-side configuration, and references may be properly resolved between the device and the computing environment host 12 through the addressing model.

In the second exemplary configuration 130, the application is again represented in an object hierarchy 14 on the computing environment host 12 as an application binary 112 and an application resource 114. However, this application instance is invoked as a locally deployed application 132 that executes on the notebook computer 20. This context may be achieved by deploying the application binary 112 and the application resource 114 to the notebook computer 20, e.g., by representing these resources in the object hierarchy 14 and deploying at least this portion of the object hierarchy to the notebook computer 20. Moreover, the application may be configured to access the locally deployed objects instead of the objects stored in the object hierarchy 14 on the computing environment host 12. This configuration may be achieved simply by updating the base address stored by the locally deployed application instance 132. The locally deployed application instance 132 still contains an application resource reference 120 to the application resource 114. However, this application resource reference 120 remains the same, as it continues to reference the application resource 114 correctly according to its address within the object hierarchy 14. The correct routing of the application resource reference 120 to the locally deployed version of the application resource 114 is achieved through the altered base address stored in the locally deployed application 132. However, the locally deployed application instance 132 might also access resources that are not locally deployed by redirection of such requests to the computing environment host 12, e.g., through the use of a routing table such as illustrated in FIG. 6.

It may be appreciated by comparison of the first exemplary scenario 110 and the second exemplary scenario 130 of FIG. 7 that the application may therefore execute in various contexts, and references to resources may be properly routed to various deployments of the objects of the object hierarchy simply by updating a base address that is prepended to the address of the object. This reconfiguration may promote the versatility of the application in executing in a variety of contexts, and irrespective of the deployment of the objects in the object hierarchy. For example, the application may be readily configurable for operation as a natively deployed application, or as a client-side application in a web browser, or as a server-side application that communicates with the user via a web interface rendered on a device. The application may also be readily configured for either online access (accessing objects stored on an accessible remote server) or offline access (accessing a local snapshot of the objects stored locally, and comprising locally hosted application binaries and resources.)

Figure 8:
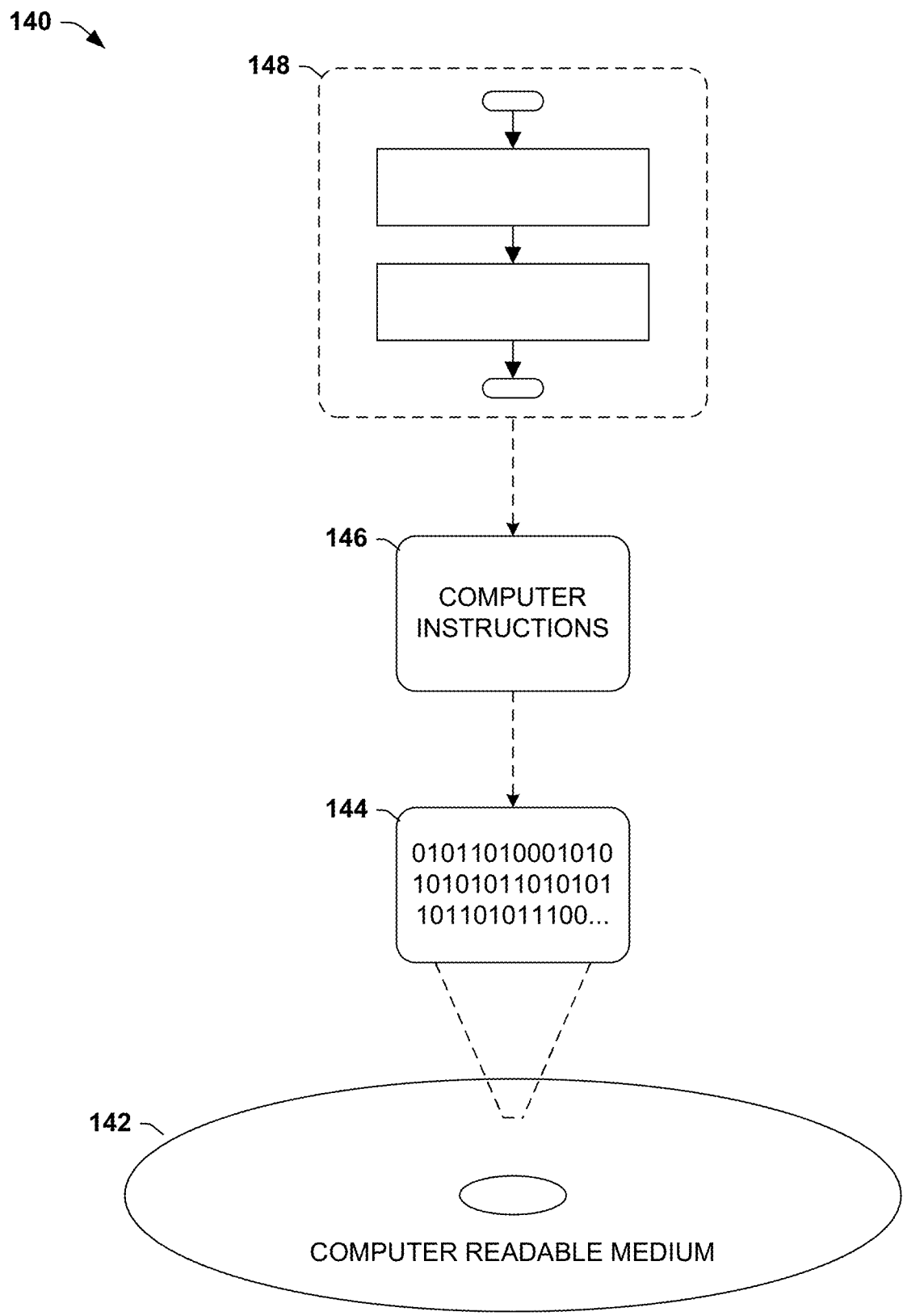
FIG. 8 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 8, wherein the implementation 140 comprises a computer-readable medium 142 (e.g., a CD-R, DVD-R, or a platter of a hard disk drive), on which is encoded computer-readable data 144. This computer-readable data 144 in turn comprises a set of computer instructions 146 configured to operate according to the principles set forth herein. In one such embodiment, the processor-executable instructions 146 may be configured to perform a method of configuring an application to operate within a computing environment, such as the exemplary method 70 of FIG. 4. In another such embodiment, the processor-executable instructions 146 may be configured to implement a system for executing an application represented in an object hierarchy representing a computing environment, such as the exemplary system 84 of FIG. 5. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
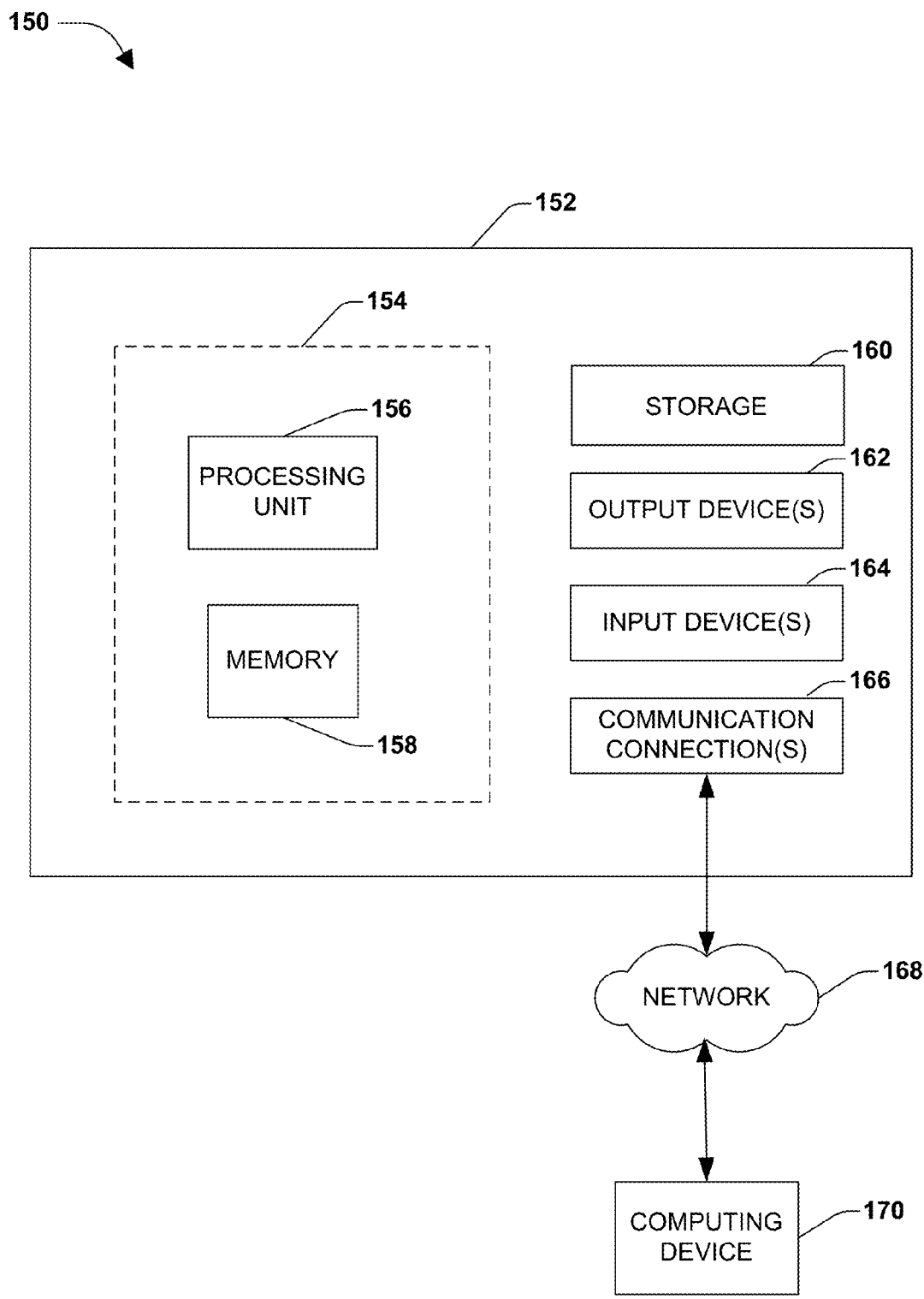
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 150 comprising a computing device 152 configured to implement one or more embodiments provided herein. In one configuration, computing device 152 includes at least one processing unit 156 and memory 158. Depending on the exact configuration and type of computing device, memory 158 may be volatile (such as RAM, for example), non-volatile (such as ROM, flash memory, etc., for example) or some combination of the two. This configuration is illustrated in FIG. 9 by dashed line 154.

In other embodiments, device 152 may include additional features and/or functionality. For example, device 152 may also include additional storage (e.g., removable and/or nonremovable) including, but not limited to, magnetic storage, optical storage, and the like. Such additional storage is illustrated in FIG. 9 by storage 160. In one embodiment, computer readable instructions to implement one or more embodiments provided herein may be in storage 160. Storage 160 may also store other computer readable instructions to implement an operating system, an application program, and the like. Computer readable instructions may be loaded in memory 158 for execution by processing unit 156, for example.

The term "computer readable media" as used herein includes computer storage media. Computer storage media includes volatile and nonvolatile, removable and non-removable media implemented in any method or technology for storage of information such as computer readable instructions or other data. Memory 158 and storage 160 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 152. Any such computer storage media may be part of device 152.

Device 152 may also include communication connection(s) 166 that allows device 152 to communicate with other devices. Communication connection(s) 166 may include, but is not limited to, a modem, a Network Interface Card (NIC), an integrated network interface, a radio frequency transmitter/receiver, an infrared port, a USB connection, or other interfaces for connecting computing device 152 to other computing devices. Communication connection(s) 166 may include a wired connection or a wireless connection. Communication connection(s) 166 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 152 may include input device(s) 164 such as keyboard, mouse, pen, voice input device, touch input device, infrared cameras, video input devices, and/or any other input device. Output device(s) 162 such as one or more displays, speakers, printers, and/or any other output device may also be included in device 152. Input device(s) 164 and output device(s) 162 may be connected to device 152 via a wired connection, wireless connection, or any combination thereof. In one embodiment, an input device or an output device from another computing device may be used as input device(s) 164 or output device(s) 162 for computing device 152.

Components of computing device 152 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 152 may be interconnected by a network. For example, memory 158 may be comprised of multiple physical memory units located in different physical locations interconnected by a network.

Those skilled in the art will realize that storage devices utilized to store computer readable instructions may be distributed across a network. For example, a computing device 170 accessible via network 168 may store computer readable instructions to implement one or more embodiments provided herein. Computing device 152 may access computing device 170 and download a part or all of the computer readable instructions for execution. Alternatively, computing device 152 may download pieces of the computer readable instructions, as needed, or some instructions may be executed at computing device 152 and some at computing device 170.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of deploying an application that utilizes a resource to a device, the method comprising:
   storing an object hierarchy comprising at least two application versions of the application that are respectively adapted for a connectivity context between the application and the resource, wherein the at least two application versions comprise:
  a first application version adapted to interact with the resource in a local connectivity context, and
  a second application version adapted to interact with the resource in a remote connectivity context;
evaluating a connectivity between the device and the resource to determine the connectivity context of the application with the resource;
identifying a selected portion of the object hierarchy that includes a selected application version of the application that is adapted for the connectivity context between the device and the resource, and that excludes an excluded application version of the application that is not adapted for the connectivity context between the device and the resource; and
synchronizing the selected portion of the object hierarchy that includes the selected application version of the application with the device.

2. The method of claim 1, wherein:
the at least two application versions of the application further comprise application versions that are respectively adapted for an execution context selected from an execution context set, comprising:
  a local execution context, wherein the application is configured to execute on the device as a native device application;
  a web client application execution context, wherein the application is configured to execute on the device within a web browser and to communicate with a second device comprising a web application server; and
  a web server application execution context, wherein the application is configured to execute on the device and to communicate with a second device comprising a web application client; and
identifying the selected portion of the object hierarchy further comprises:
  determining, within the execution context set, a selected execution context in which the application is to execute on the device; and
  identifying a selected portion of the object hierarchy that includes an included application version of the application that is further adapted for the selected execution context of the application on the device, and that excludes an excluded application version of the application that is adapted for a different execution context of the application on the device.

3. The method of claim 2, wherein:
the local execution context of the application is further configured to present to the user a user interface that is consistent with natively executing applications; and
the web client execution context of the application is further configured to present to the user a user interface that is consistent with web applications executing within a web browser.

4. The method of claim 1, wherein:
the application versions of the application further comprise application versions that are respectively adapted for a device trust level selected from a device trust level set, comprising:
  a trusted application version that is adapted for execution on a trusted device, and
  an untrusted application version that is adapted for execution on an untrusted device; and identifying the selected portion of the object hierarchy further comprises:
  performing a trust determination of the device as one of a trusted device and an untrusted device; and
  identifying the selected portion of the object hierarchy including an included application version of the application that is adapted to execute on the device according to the trust determination of the device, and excluding an excluded application version of the application that is not adapted to execute on the device according to the trust determination of the device.

5. The method of claim 1, wherein:
the application versions of the application further comprise application versions that are respectively adapted for a device resource level selected from a device resource level set, comprising:
  a full-featured application version that is adapted for execution on resource-rich devices, and
  a reduced-feature application version that is adapted for execution on limited-resource devices; and
identifying the selected portion of the object hierarchy further comprises:
  performing a resource determination of the device as one of a resource-rich device and a limited-resource device; and
  identifying the selected portion of the object hierarchy that includes a selected application version of the application that is adapted to execute according to the resource determination of the device, and that excludes an excluded application version of the application that is not adapted to execute according to the resource determination of the device.

6. The method of claim 1, wherein:
the object hierarchy is authoritatively stored by a computing environment host;
the remote connectivity context involves accessing the objects of the object hierarchy stored on the computing environment host; and
the method further comprises: configuring the application to access the objects of the object hierarchy further comprises: configuring the included application version of the application to communicate with the computing environment host to access the object of the object hierarchy stored on the computing environment host.

7. The method of claim 6, wherein:
the computing environment host provides a RESTful interface to the object hierarchy; and
the method further comprises: configuring the included application version of the application to apply respective actions to the objects of the object hierarchy by issuing a command to the RESTful interface of the computing environment host.

8. The method of claim 7, further comprising: configuring the application to access the objects of the object hierarchy while obscuring the connectivity context of the application with the computing environment host from the application.

9. The method of claim 1, wherein:
the application versions of the application comprise:
  a first application binary that is compatible with a first device architecture and that is not compatible with a second device architecture, and
  a second application binary that is compatible with the second device architecture and not the first device architecture; and
identifying the selected portion of the object hierarchy further comprises:
  identifying a selected device architecture of the device;

identifying a selected application version of the application binary of the device that is compatible with the selected device architecture of the device; and
identifying the selected portion of the object hierarchy that includes the first application binary for the selected application version of the application, and that excludes an excluded application binary for an excluded application version of the application that is not compatible with the selected device architecture of the device.

10. The method of claim 1, wherein:
respective application versions of the application further comprise a source document of the application; and
synchronizing the selected portion of the object hierarchy with the device further comprises: transmitting, to the device, the source document of the selected application version of the application to be compiled to generate the application.

11. The method of claim 1, wherein:
respective application versions of the application further comprise a source document of the application; and
synchronizing the selected portion of the object hierarchy with the device further comprises:
selecting the source document for the selected application version;
compiling the source document for the selected application version to generate an application binary that is compatible with execution by the device; and
transmitting the application binary for the selected application version to the device.

12. The method of claim 1, wherein:
respective objects further comprise an object hierarchy address identifying a location of the object within the object hierarchy; and
the method further comprises: configuring the included application version of the application to access the respective objects according to the object hierarchy address of the object within the object hierarchy.

13. The method of claim 1, wherein:
the application versions of the application further comprise application versions that are respectively adapted for interaction between the device and the resource according to a resource bandwidth, including:
a high-bandwidth application version that is adapted for high-bandwidth access between the device and the resource, and
a low-bandwidth application version that is adapted for low-bandwidth access between the device and the resource, and
identifying the selected portion of the object hierarchy further comprises:
performing a bandwidth determination of bandwidth between the device and the resource; and
identifying the selected portion of the object hierarchy including a selected application version of the application that is adapted to access the resource according to the bandwidth determination of bandwidth between the device and the resource, and excluding an excluded application version of the application that is not adapted to access the resource according to the bandwidth determination of bandwidth between the device and the resource.

14. A method of configuring a client device, having a set of device properties, to present a computing environment represented by an object hierarchy hosted by a computing environment host and comprising objects respectfully associated with at least two application versions of an application that interacts with a resource in a connectivity context, wherein respective application versions are adapted for the connectivity context between the application and the resource, including:
a first application version adapted to interact with the resource in a local connectivity context, and
a second application version adapted to interact with the resource in a remote connectivity context,
the method comprising:
synchronizing the object hierarchy stored on the client device with a selected portion of the object hierarchy hosted on the computing environment host, wherein the selected portion includes a selected application version of the application that is adapted for the connectivity context between the client device and the resource, and excludes an excluded application version of the application that is not adapted for the connectivity context between the client device and the resource; and
executing the included application version of the application within the computing environment within the selected portion of the object hierarchy to interact with the resource in the connectivity context.

15. The method of claim 14, wherein:
respective application versions of the application further comprise a source document of the application; and
the method further comprises, responsive to receiving the first object comprising a source document for the included application version:
compiling the source document of the included application version to generate an application binary of the included application version of the application; and
executing the application binary.

16. The method of claim 1, wherein:
the computing environment host further provides a RESTful interface to the object hierarchy; and
the method further comprises: responsive to a request from the application to apply an action to an object of the object hierarchy, issue a command to the RESTful interface of the computing environment host to apply the action to the object of the object hierarchy.

17. The method of claim 14, wherein:
the application versions of the application further comprise:
a full-featured application version that is adapted for resource-rich devices, and
a reduced-feature application version that is adapted for limited-resource devices; and
synchronizing the object hierarchy stored on the client device with the selected portion of the object hierarchy hosted on the computing environment host further comprises:
evaluating a resource set of the client device to perform a resource determination of the client device as one of a resource-rich device and a limited-resource device; and
synchronizing, with the computing environment host, the selected portion of the object hierarchy including an included application version of the application that is adapted according to the resource determination of the client device, and excluding an excluded application version of the application that is not adapted according to the resource determination of the client device.

18. A system that deploys an application executable within a computing environment of a computing environment host to a device, the system comprising:
an object hierarchy comprising at least two application versions of an application respectfully adapted for a connectivity context between the application and the resource, wherein the at least two application versions comprise:

a first application version adapted to interact with the resource in a local connectivity context, and a second application version adapted to interact with the resource in a remote connectivity context; and an application deployer that deploys the application to the device by:

evaluating a connectivity between the device and the resource to determine the connectivity context of the application with the resource;

identifying a selected portion of the object hierarchy that includes a selected application version of the application that is adapted for the connectivity context between the device and the resource, and that excludes an excluded application version of the application that is not adapted for the connectivity context between the device and the resource; and synchronizing the selected portion of the object hierarchy that includes the selected application version of the application with the device.

19. The server of claim 18, wherein:

the application versions of the application comprise:

a full-featured application version that is adapted for execution on resource-rich devices, and a reduced-feature application version that is adapted for execution on limited-resource devices; and the application deployer identifies the selected portion of the object hierarchy by:

performing a resource determination of the device as one of a resource-rich device and a limited-resource device; and identifying the selected portion of the object hierarchy that includes a selected application version of the application that is adapted to execute according to the resource determination of the device, and that excludes an excluded application version of the application that is not adapted to execute according to the resource determination of the device.

20. The system of claim 18, wherein:

the computing environment host provides a RESTful interface to the object hierarchy; and the system further comprises: an application applier that applies respective actions to the objects of the object hierarchy by issuing a command to the RESTful interface of the computing environment host.

* * * * *